United States Patent [19]

Bartmann et al.

[11] Patent Number: 4,814,431

[45] Date of Patent: Mar. 21, 1989

[54] PROCESS FOR IMPROVING THE COLOR QUALITY OF POLYPHENYLENE OXIDE WITH UNSATURATED CARBOXYLIC ACID ESTER

[75] Inventors: Martin Bartmann, Recklinghausen; Wilfried Ribbing, Dorsten, both of Fed. Rep. of Germany

[73] Assignee: Huls Aktiengesellschaft, Marl, Fed. Rep. of Germany

[21] Appl. No.: 79,960

[22] Filed: Jul. 31, 1987

[30] Foreign Application Priority Data

Oct. 8, 1986 [DE] Fed. Rep. of Germany ....... 3634224

[51] Int. Cl.[4] .............................................. C08G 65/46
[52] U.S. Cl. .................................... 528/491; 524/315; 524/611; 528/486
[58] Field of Search ................ 528/486, 491; 524/315, 524/611

[56] References Cited

U.S. PATENT DOCUMENTS

| | | | |
|---|---|---|---|
| 4,237,265 | 12/1980 | Gliassen et al. | 528/486 |
| 4,263,426 | 4/1981 | Cooper et al. | 528/486 |
| 4,460,764 | 7/1984 | Reffert et al. | 528/486 |

Primary Examiner—Harold D. Anderson
Attorney, Agent, or Firm—Oblon, Fisher, Spivak, McClelland & Maier

[57] ABSTRACT

A process for improving the color quality of PPE or molding compounds containing PPE, comprising adding an $\alpha,\beta$-unsaturated ester of the formula:

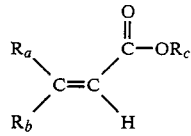

to the organic PPE solution prior to heating it to temperatures above 150° C. $R_a$ and $R_b$ are independently H, $CH_3$, $COOR_c$, or Ph, and $R_c$ is a $C_{1-10}$ alkyl group.

5 Claims, No Drawings

PROCESS FOR IMPROVING THE COLOR QUALITY OF POLYPHENYLENE OXIDE WITH UNSATURATED CARBOXYLIC ACID ESTER

BACKGROUND OF THE INVENTION

1. Field of the Invention:

The invention relates to a process for improving the color quality of molding compounds that contain polyphenylene ether (PPE) or consist of it exclusively.

2. Discussion of the Background:

It is known that PPE is very sensitive to thermal stress, which manifests itself in the formation of dark-colored products with a quinone structure, even in the absence of oxygen. Impurities of all types naturally affect substantially the color quality of PPE and molding compounds containing PPE. The problem becomes particularly important when the PPE is not isolated by precipitation with an antisolvent, but a so-called direct isolation process is followed, which is more beneficial from the process point of view. Such a process consists of removing interfering impurities, such as catalyst components and byproducts of the reaction such as diphenoquinone, from the polymer formed after the oxidative coupling reaction in solution, elimination of most of the solvent by distillation, and introduction of the material into an extruder, optionally with the addition of other polymer components, flameproofing agents, and other additives.

It is known that the terminal OH groups of polyphenylene ether can be converted into a stable form by reaction with reactive compounds such as acid chlorides and acid anhydrides, for example.

JP-OS No. 71/02837 discloses reacting the terminal groups of PPE with acrylamides in the presence of basic compounds to protect the PPE against oxidative degradation. Nevertheless, unsatisfactory color changes also occur in such masked polyphenylene ethers with the evolution of heat. It must therefore be assumed that the observed reactions are not restricted to the terminal groups of PPE.

German Pat. No. 16 94 258 discloses the addition of 0.1 to 6 wt. % of organic phosphites as stabilizers for PPE. Such stabilizers prevent oxidative damage of the PPE in the further processing of a powder or granulate.

It has also been proposed to add chelating agents and other stabilizers such as difunctional phenols and reducing agents (see DE-OS No. 27 54 887 and DE-PS No. 26 16 746) or aromatic amines (see DE-OS No. 27 55 937) to the polymer solutions. While the chelating agents are said to eliminate the harmful effects of residues of the metal catalyst in the product, the reducing agents serve to convert colored quinones. These solutions are unsatisfactory since the additives are sometimes needed in substantial concentrations. They also make the isolation of the polyphenylene ethers more difficult. In particular, no color stabilization is achievable by these measures when using higher temperatures.

Another added difficulty is the fact that PPE alone and its mixtures with styrene polymers tend to increase in molecular weight during the extrusion. This is undesirable since the flow characteristics of the polymer then deteriorate and higher temperatures become necessary in the extrusion (see EP-OS No. 0 121 974, page 1). To avoid this, it is proposed to stabilize the molecular weight during the extrusion of PPE or PPE molding compounds by adding solid dienophiles such as maleimides, or maleic acidamides which are converted into maleimides under the described reaction conditions, and acenaphthene. These compounds are thermally unstable, i.e., thermal polymerization occurs at higher temperatures. Bismaleimides, which develop crosslinked structures even between 180° and 240° C. (see Polym. 26, 1561 ff. (1985)) are expressly excluded (see U.S. Pat No. 4,389,516=DE-PS No. 31 11 403). This "curing" is said to occur through free radicals as shown below.

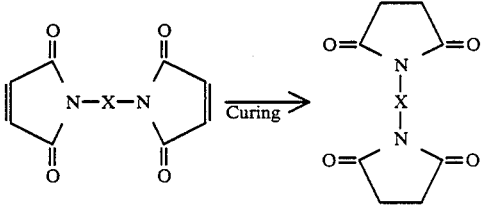

If crosslinked composites are obtained in this reaction in the prsence of PPE, as stated in EP-OS No. 0 121 974, page 3, lines 1–5, then it must be assumed that the PPE in the case of the bismaleimides is incorporated in this network by radical transfer reactions. This is undesirable since it amounts to an increase of the molecular weight with the undesirable consequences noted above.

According to information disclosed in DE-OS No. 24 30 130, the oxidative coupling reaction of monomeric phenols proceeds even after termination of the actual reaction, with a "zipper-like depolymerization reaction" occurring on the one hand and a crosslinking reaction on the other. The latter is caused by the fact that hydrogen atoms on the alpha-carbon atom of the side chain are split off and active methylene groups are formed. These reactions take place even when the catalyst is deactivated. After treatment of the PPE simultaneously with a difunctional phenol or benzoquinone and a mild reducing agent such as hydrazine (see DE-PS No. 24 30 130), it is in fact possible to obtain a PPE of reproducible molecular weight after the oxidative coupling reaction. However, the problems that occur during the extrusion are not solved.

Graft polymers prepared by polymerization of styrene in the presence of PPE and a radical initiator, are said to have an improved color quality according to JP-OS No. 72/105,414. This process is thus unsuitable for molding compounds that contain no polystyrene.

SUMMARY OF THE INVENTION

Accordingly, one object of the present invention is to provide a process for the production of PPE or molding compounds containing PPE by the direct isolation process and without substantial discoloration.

Another object of the invention is to provide a process in which the molecular weight of the PPE does not substantially increase during processing.

These and other objects have been achieved by the present process which comprises (a) preparing a solution of PPE and (b) adding an α,β-unsaturated ester having the formula $R_a R_b C = CHCOOR_c$, wherein $R_a$ and $R_b$ are, independently, H, $CH_3$, $COOR_c$ or phenyl and wherein $R_c$ is a $C_{1-10}$ alkyl group, to said solution before said solution has been heated above 150° C.

DETAILED DESCRIPTION OF THE PREFERRED EMBODIMENTS

The present invention is directed to a process for the production of PPE or molding compounds containing PPE that satisfy the following objectives:

(1) In the thermal treatment of PPE and material containing PPE, which is preferably obtained by the direct isolation process, discolorations occur that can be attributed to the formation of quinones, particularly diphenoquinone. These are to be converted into a form in which they provide no occasion for color degradation, even after heating. This effect, which can occur even at 140° C. and lower and is very pronounced at temperatures above 200° C., is undesirable. According to the state of the art, temperatures which are usually above 240° C. are necessary for the production of PPE and molding compounds containing PPE.

(2) The PPE produced by the direct isolation process tends toward an increase of molecular weight at elevated temperatures. This manifests itself negatively especially during extrusion, since the flow properties are degraded at the same time.

It has now been found that PPE or molding compounds containing PPE of improved color quality are obtained when an $\alpha,\beta$-unsaturated ester is added in amounts of 0.5 to 5 wt. % based on the PPE present before the temperature of the solution is increased above 150° C., and the PPE solution is then treated in the usual way.

The effect of the ester depends on the fact that a Diels-Alder adduct is surprisingly formed from the acid derivative and the diphenoquinone according to the following reaction.

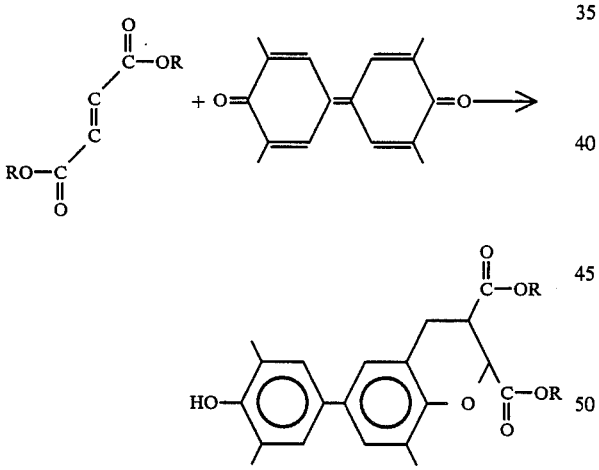

The process of the invention has the following advantages:

(1) The dienophiles are mixed with the polyphenylene ethers in solid form by the method of EP-PS No. 0 121 974 and the resulting mixture is used for further processing. To provide a homogeneous mixture, a more or less thorough mixing action is necessary depending on the viscosity of the melt. The homogeneous mixing of a small amount of liquid with a large amount of solid that is present as a powder in this case is technically difficult. On the other hand, the $\alpha,\beta$-unsaturated esters pursuant to the invention can be added to a dilute solution of the PPE during or after the oxidative coupling reaction, and immediately provide a homogeneous solution. The addition of the $\beta$-unsaturated ester before the beginning of the oxidative coupling reaction, for example to the monomeric phenol, is particularly preferred and has great technical benefit. Addition of the maleic anhydride derivatives provided for in EP-OS No. 0 121 974 at the beginning of the oxidative coupling reaction is not possible, since these compounds are chemically unstable under the reaction conditions.

(2) Maleic anhydride, amide, and imide, as well as acenaphthene, tend toward thermal polymerization when hot. This means that only a small amount of these compounds can be used to provide a color-stabilizing action. Furthermore, bismaleimides form undesirable crosslinked structures.

(3) The $\alpha,\beta$-unsaturated esters not only improve the color quality of the PPE, but they also prevent the undesirable increase in molecular weight of the PPE during extrusion (see Tables 1 and 2).

(4) The polyphenylene ethers obtained by this process can be processed more easily, since they have better flow properties.

Processes for the oxidative coupling reaction of phenols are known (for example, see German OS Nos. 32 24 692, 32 24 691, 33 13 864, 33 32 377, 33 37 29, 34 19 601, and 34 42 141, and the literature cited in these publications).

Suitable phenols have the formula:

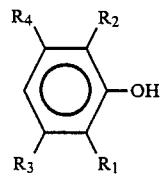

in which $R_3$ and $R_4$ are H or $CH_3$, with $R_1$ and $R_2$ standing for n- or i-alkyl groups with 1 to 6 carbon atoms. Preferably, 2,6-dimethylphenol or 2,3,6-trimethylphenol are used.

The reaction is preferably carried out in the presence of a copper-amine catalyst and optionally an activator.

There are various possibilities for terminating the oxidative coupling reaction and purifying the polymer of impurities (see for example German OS Nos. 33 32 377, 34 19 601, and 34 42 141).

Accordingly to the embodiment that is preferred here, the polycondensation is terminated by adding a dilute aqueous solution of triethanolamine and introducing carbon dioxide. The organic phase is separated and extracted according to the process of DE-OS No. 33 32 377. Finally, the solution is concentrated by distillation at atmospheric pressure until a solids concentration of approximately 50 wt. % is reached.

Common preferred solvents in which the PPE is formed include aromatic hydrocarbons such as toluene or xylene, as well as their mixtures with low alcohols, chlorinated hydrocarbons such as chloroform, methylene chloride, dichloroethane, etc.

Suitable $\alpha,\beta$-unsaturated esters have the formula:

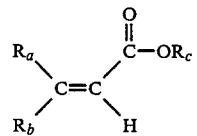

In this formula, $R_a$ and $R_b$ independently stand for hydrogen, the methyl group, the ester group —$COOR_c$, or the phenyl group. Fumaric esters and cinnamic esters are preferred. $R_c$ is an alkyl group with 1-10, preferably 1 to 5 carbon atoms. The total amount of added ester based on the PPE present is 0.5 to 5 wt. %.

The esters can be added to the PPE solution before, during, or after the oxidative coupling reaction. They are so hydrophobic that they remain mostly in the organic phase during the aqueous processing and are inert under the conditions of the oxidative coupling reaction and the subsequent processing with separation of the catalyst. It is also possible to add the esters during the processing. It is critical for the esters to be added to the solution containing PPE before the solution is subjected to a temperature higher than 150° C., preferably not higher than 100° C.

The subsequent processing requires the use of elevated temperatures to free the PPE of the solvent. A process for the concentration of PPE solutions is described in German patent application P No. 36 00 754.4 filed January 14, 1986.

It is customary to remove small residual amounts of solvents in an extruder, with temperatures rising to 240° C. and higher. In practice, pure PPE is generally not synthesized. Instead, polystyrene is added either to dilute or to concentrated PPE solutions or to the PPE melt to improve the flowability (see DE-OS No. 33 37 629 and German patent application P No. 36 03 798). It is also possible to add other polymers such as polyolefins, polyamides, or high-impact modified styrene polymers to the PPE, as known from the literature.

The examples below show that the absorption (log $I_o/I$) at 420 and 500 nm is reduced and the color quality is thus improved by the addition of the esters. It can be seen from the J-values, which represent a measure of the molecular weight, that an untreated polyphenylene ether experiences a substantial increase in molecular weight when it is heated for 30 minutes at 300° C. This temperature treatment corresponds to the thermal stress that the PPE experiences in the process of direct isolation. The product that has been precipitated as a powder and is then used to produce molding compounds containing PPE experiences a comparable stress.

Other features of the invention will become apparent in the course of the following descriptions of exemplary embodiments which are given for illustration of the invention and are not intended to be limiting thereof.

EXAMPLES

EXAMPLES 1-4 AND COMPARATIVE TEST A

A solution of 1.5 g of $CuCl_2 \cdot H_2O$ in 20 g of methanol in a 3-liter reactor with stirring (750 rpm) is combined with a mixture of 1300 g of toluene, 177 g of methanol, 30 g of morpholine, and 1.5 g of N,N'-di-t-butylethylenediamine at 30° C. while nitrogen is bubbled through the mixture (100 l/h). After 5 minutes, the nitrogen stream is replaced by a stream of air at 100 l/h and a solution of 150 g of 2,6-dimethylphenol and the additives listed in Table 1 in 150 g of toluene is added dropwise over a period of 30 minutes. After 55 minutes, the flow of air is reduced to 40 l/h. 15 minutes later, the polycondensation is terminated by adding a solution of 2 g of triethanolamine in 425 ml of water and $CO_2$ is bubbled into the reactions solution (200 l/h) until the exothermic reaction has subsided. The phases are then separated, the isolated organic phase is refluxed twice with 425 ml of water and 2 g of triethanolamine for 30 minutes, the organic phase is isolated, and the solids concentration is increased to 50 wt. % by distillation at atmospheric pressure. The cooled, solidified compounds are heated in a stainless steel autoclave for 30 minutes at 300° C. After cooling, a 1% solution of the residues is prepared in chloroform and the absorption is determined at 420 and 500 nm (1 cm cell).

TABLE 1

| Ex-am-ple No. | Additive | Parts/100 parts of PPE resin | J-Value After terminating the polycondensation | J-Value After heating at 300° C. | Absorption (log $I_o/I$) at 420 nm | Absorption (log $I_o/I$) at 500 nm |
|---|---|---|---|---|---|---|
| 1 | Dibutyl fumarate | 5 | 55 | 57 | 0.38 | 0.11 |
| 2 | Dibutyl fumarate | 2.5 | 55 | 59 | 0.42 | 0.13 |
| 3 | Diethyl fumarate | 2.5 | 55 | 56 | 0.41 | 0.10 |
| 4 | Methyl cinnamate | 2.5 | 55 | 60 | 0.43 | 0.12 |
| A | — | — | 55 | 70 | 1.1 | 0.2 |

EXAMPLES 5-7 AND COMPARATIVE TEST B

The procedure was analogous to that of Example 1, but the dibutyl fumarate (Examples 5, 6) or the methyl cinnamate (Example 7) is added to the organic PPE solution only after the polycondensation has been terminated by adding an aqueous triethanolamine solution and introducing $CO_2$, and the aqueous phase has been separated. The results are shown in Table 2.

TABLE 2

| Ex-am-ple No. | Additive | Parts/100 parts of PPE resin | J-Value After terminating the polycondensation | J-Value After heating at 300° C. | Absorption (log $I_o/I$) at 420 nm | Absorption (log $I_o/I$) at 500 nm |
|---|---|---|---|---|---|---|
| 5 | Dibutyl fumarate | 5 | 55 | 57 | 0.36 | 0.09 |
| 6 | Dibutyl fumarate | 2.5 | 55 | 59 | 0.41 | 0.13 |
| 7 | Methyl cinnamate | 2.5 | 55 | 59 | 0.43 | 0.11 |
| B | — | — | 55 | 72 | 1.2 | 0.23 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for producing polyphenylene ether or a molding compound containing polyphenylene ether having improved color quality, comprising the steps of:
   (i) preparing a solution of polyphenylene ether,
   (ii) adding an $\alpha,\beta$-unsaturated ester having the formula

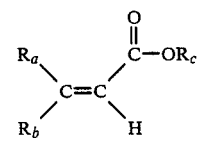

to said solution wherein $R_a$ and $R_b$ are, independently, H, $CH_3$, $COOR_3$ or phenyl and wherein $R_c$ is the $C_{1-10}$ alkyl group, wherein said ester is added to said solution before said solution has been heated above 150° C.

2. The process of claim 1, wherein said ester is a fumaric or cinnamic ester.

3. The process of claim 1, wherein $R_c$ is a $C_{1-5}$ alkyl group.

4. The process of claim 1, wherein the amount of said ester added is between 0.5–5 wt. % based on the polyphenylene ether.

5. The process of claim 1, wherein said adding step occurs before said solution has been heated above 100° C.

* * * * *